July 18, 1939.  J. F. PUTNAM  2,166,609
PIPE FEED DEVICE
Filed June 14, 1937
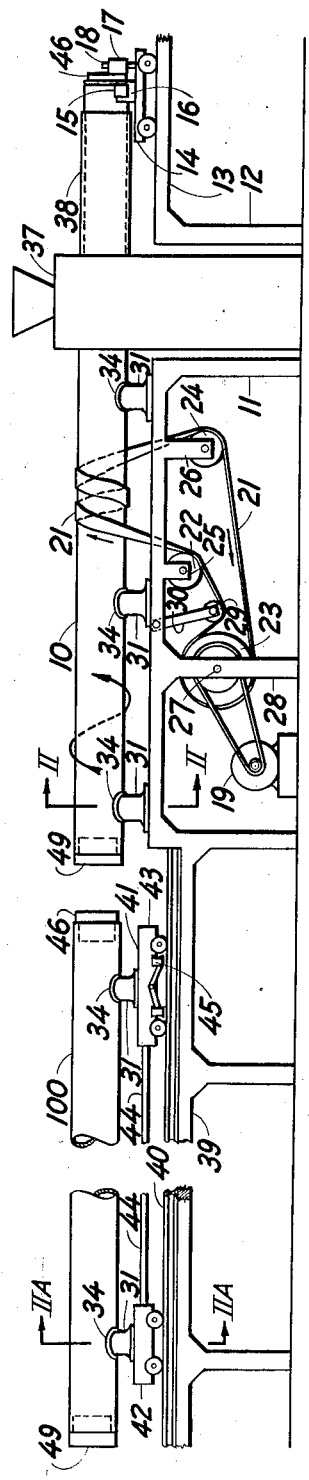
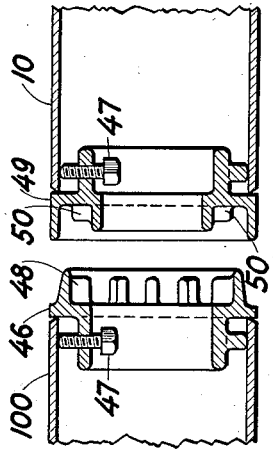
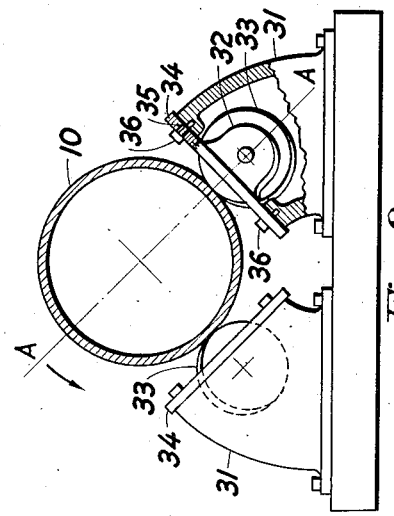
Inventor
JOSEPH F. PUTNAM
by J. H. Adams
Attorney Patented July 18, 1939

2,166,609

UNITED STATES PATENT OFFICE 2,166,609

PIPE FEED DEVICE

Joseph F. Putnam, Berkeley, Calif., assignor to Standard Oil Company of California, San Francisco, Calif., a corporation of Delaware Application June 14, 1937, Serial No. 148,246

10 Claims. (Cl. 242—11)

This invention relates to the art of pipe coating and particularly refers to a means for temporarily coupling together and feeding a succession of lengths of pipe which are to be passed through a continuously operating helical feed coating machine adapted to apply a layer or wrapping of corrosion resistant material to the outer surface of the pipe. This application is a continuation in part of my co-pending application Serial No. 469,289 filed July 21, 1930, which issued April 5, 1938, as Patent No. 2,112,865.

Certain continuous pipe coating operations require that a helical feed, i. e. a combined rotating and longitudinal motion, be given to the pipe, so that any given point on its outer surface describes a helix, in order that a coating of paint, or a plastic layer of corrosion resistant material, or a flexible tape adapted to prevent corrosion, may be continuously applied. Another requirement is that successive lengths of pipe be securely aligned and abutted or coupled together during their passage through the device which gives them such a helical motion, and thence through the coating equipment, after which the lengths must be quickly and easily uncoupled or separated, so that they may be stacked or stored for use.

It will be appreciated that, as any one length of pipe advances into, through and out of the helical feed device, the requirements imposed upon the means coupling it to the preceding and to the succeeding lengths of pipe are severe. As the pipe length or section approaches the helical feed mechanism, which may be of any known type, but in this example is that disclosed in my co-pending application Serial No. 469,289 now Patent 2,112,865, which will be described below, the pipe must be securely coupled to and aligned with the length already in the mechanism so that it will follow said length. Assuming a counter-clockwise direction of rotation of the pipe, the leading part of the coupling, which is secured to the pipe already in the machine, must transmit a counter-clockwise torque to the trailing part of the coupling which is secured to the following pipe length. In order to prevent separation of the two parts of the coupling and the two pipes, a longitudinal force in the direction of motion must be imparted to the trailing section of the coupling or to the pipe in which it is secured by some means acting either upon the coupling or upon the following pipe section.

After the coupling joining the two pipes passes through the helical feed mechanism the relative direction of torque between the two halves or parts of the coupling is reversed from that just described. The trailing part of the coupling must now transmit counter-clockwise torque to the leading part, and due to the usual requirement that the lengths of pipe be kept in closely abutting contact until they have passed through the coating operation, which ordinarily follows the imparting of the helical motion, it is apparent that the two parts of the coupling must transmit torque in either direction. This automatically precludes any sort of screw thread arrangement, as such would obviously tend to become unscrewed either before or after the coupling passed through the helical feed means, due to the torque reversal just described.

A further requirement for this service is that after the coupling has passed entirely through the helical feed means and the pipe coating means, the two parts of the said coupling must be readily separable without any extensive rotation or manipulation of the freshly coated length of pipe, so that the latter may be removed as for storage.

This invention broadly comprehends a simple coupling for a pipe coating operation of this nature and a means for keeping the two parts thereof, as well as the pipes which they join, in close and operative contact before, during and after passage through a helical feed means which may be followed by a pipe coating means, with the added advantage of providing a ready separation of the coupler parts and the pipe lengths which they have secured together, after the completion of the coating operation.

For larger pipe sizes I prefer a coupling of a simple jaw type that is adapted only for torque transmission, without the addition of lugs or hooks on the interengaging jaws or equivalent means to make it adapted also for a transmission of a longitudinal force. Such a coupling is described and claimed in the co-pending patent application, assigned to the common assignee herewith, filed June 24, 1935, by W. R. Postlewaite as Serial No. 28,094, which issued April 20, 1937, as Patent No. 2,077,769. Briefly, it comprises two separable clutch sections with lugs adapted to transmit a torque in either direction together with certain self-aligning features not essential to this invention. This invention, however, is equally applicable to a simple one piece tapered plug coupler retained in the pipe by friction alone, particularly for smaller sizes of pipe, in which a separable type would not be practicable.

In my co-pending application Serial No. 469,289, now Patent 2,112,865, there is disclosed a novel means for accurately controlling the helix angle of a helically advancing pipe, whose rotation component may be supplied by any suitable means as an encircling wheel carrying inclined drive rollers or a belt wrapped several times around the pipe and driven by a motor. It has been found that, contrary to certain patent teachings, such a belt alone will not give a uniform, controlled, accurate helical feed unless a plurality of accurately fixed axially inclined rollers or equivalent guide means were provided to support the pipe and to engage its outer surface along the exact helical path which is desired for the pipe.

This invention comprehends broadly the adaptation or extension of the means for accurately controlling the helical motion of the pipe as just described, to the problem outlined above, namely, of keeping together the two parts of a jaw type coupler securing together two adjacent sections of pipe being coated, before, during and after they pass through a helical feed machine of any available or known type. Large scale commercial embodiments of this invention, adapted for pipe sizes as large as 18 inches in diameter, have been constructed and are now being successfully operated with greater facility and with less expense than the apparatus heretofore available.

It is an object of this invention to provide a simple jaw clutch type of pipe coupling and feed means for helically advancing pipe to keep the two parts of said coupling, one in each abutting length of pipe, in close contact before, during and after the abutting pipe joints and coupling have passed through the helical feed means, by means separate from the coupling itself.

Another object is to provide a simple jaw clutch type of coupling means for helically moving pipe together with means for quickly bringing together successive lengths of uncoated pipe as they are fed into and through a continuously operating pipe coating machine.

Another object is to provide a simple pipe advancing means that will be adapted to freely receive a length or section of pipe, advance the same and couple it to a preceding helically moving section of pipe and then maintain it in close contact therewith until the said first length has been engaged by a helical feed means.

These and other objects and advantages will be further apparent from the following description and from the accompanying drawing, which forms a part of this specification and illustrates a preferred embodiment of an apparatus suitable for carrying out this invention.

In the drawing, Figure 1 is a vertical elevation view of a continuous pipe coating installation illustrating the uncoated pipe advancing means, the helical feed means of my co-pending application and a diagrammatic form of coating applying means.

Figure 2 is a vertical sectional view on line II—II of the apparatus shown in Figure 1, and illustrates a preferred construction of a skewed roller assembly to control the helix angle of the helical feed means and the advancing means.

Figure 3 is a vertical sectional view in the plane of the pipe axis and illustrates a preferred form of jaw type coupler for joining together successive sections or lengths of pipe.

Referring to Figure 1, the reference numeral 11 designates a base frame in alignment with a discharge table 12 having tracks or guides 13 adapted to receive any suitable form of carriage 14 arranged to move longitudinally along the discharge table 12. The carriage 14 may be provided with horizontal rollers 15 journalled in suitable yokes 16 and may also be provided with a vertical roller 17 journalled on pin 18, the latter roller being adapted to abut with the end of the pipe or other cylindrical object 10 being fed through the machine, so that the carriage is enabled to support the free end of pipe 10 and also be moved by the pipe along track 13.

The machine may utilize any means for imparting rotation to the pipe. In this example, it is preferred to use an endless belt 21 trained around the pipe 10 and passing over pulleys 22, 23 and 24. Pulleys 22 and 24 may be journalled on shafts held within hangers 25 and 26, respectively, the hangers being attached to the base frame 11 of the machine. The pulley 23 may be mounted on a shaft 27 journalled within a suitable hanger 28 carried by the frame 11, the shaft 27 being driven by any suitable driving mechanism as for example motor 19. A weighted roller 29 journalled in a pivoted arm 30 attached to the frame 11 may rest against belt 21 so as to maintain it under tension. Pulley 24 may be mounted at an angle to the horizontal so as to prevent belt 21 from slipping off due to the angle at which it leaves pipe 10.

Along the table or frame 11 and in spaced relation to each other brackets 31 may be mounted, the brackets being adapted to carry the bearing plates of yokes 32. The bearing plates of this example correspond to the spindles of the apparatus of my co-pending application Serial No. 469,289, now Patent No. 2,112,865 and perform the same function in the example shown in this subject case. The bearing plates 34 which support and align yokes 32, are mounted in brackets 31, so as to be movable about an axis A—A which preferably intersects the longitudinal axis of pipe 10 and is at an angle of 45° to the horizontal. The two rows of brackets 31, one row on each side of pipe 10, thus carry the yokes 32 whose axes of rotation preferably meet when extended at some point above the table and between the rows of brackets.

The yokes 32 carry freely rotatable resilient faced guide means or skew rollers 33 journalled therein. Although in my co-pending application herein referred to there are disclosed means for simultaneously adjusting the yokes, that feature forms no part of the invention disclosed and claimed herein, and it is entirely immaterial how the yokes 32 are adjusted, or secured in that adjustment, so long as certain of them are positioned or set to the same relative angle to positively guide and govern the helix angle of the pipe motion. As stated above, yokes 32 are fitted with bearing plates 34 which may be slotted as at 35 so as to be adjusted about axis A—A, and which may be secured to brackets 31 as by screws 36. It will be obvious that the angle at which plates 34 are set on one side of pipe 10 will be of the same hand as the angle to which those on the opposite side of the pipe 10 are adjusted.

Between the driving or helical feed mechanism just described and the discharge table 12 the machine may include any desired form of means, represented generically by 37, for continuously applying a corrosion resistant or other coating 38 to the pipe 10.

All of the foregoing is common subject matter with the co-pending application above identified, and a number of the essential features of the coupling and pipe advancing and feeding means yet to be described are in the same category, as will be more fully apparent from the following description.

As stated above, the principal application of the skew roller guide means is in the continuous pipe coating art, where an accurately guided helical motion is required for the lengths of pipe advancing toward and through the coating means. It has also been found that the means and principles involved therein can be applied to a mechanism for advancing successive lengths of pipe to be coupled to the preceding length that is already engaged by the helical feed means.

Referring now to the mechanism at the left end of Figure 1, the numeral 39 designates a table or support for a guide means or track 40 parallel to the axis of pipe 10 being advanced helically by the helical feed means already described. A car or carriage 41 which may be in two or more units 42 and 43, suitably coupled as by a rigid connector 44, is adapted to move on track 40, and is preferably provided with a brake or locking means 45, so that it may be secured against motion along the track at any desired point. A plurality of brackets 31 are secured to the units 42 and 43 of the carriage 41 and are provided with yokes 32, rollers 33, and adjustable bearing plates 34, as previously described for base frame 11. In other words, Figure 2 is representative of a section on line II—II and also generally represents a section through line IIA—IIA of Figure 1.

It will be appreciated that, with brake means 45 in the locked or operated position, to prevent longitudinal motion of the carriage 41 and brackets 31 with respect to the helical feed means, any rotative force or torque applied to pipe 100 will cause a controlled helical motion of that pipe, due to the longitudinal or axial component introduced by the fixed skew or inclined rollers 33 on that carriage. If the angle of inclination of all the effective rollers 33 are equal on both the locked carriage 41 and the stationary helical feed table 11, the same helical motion will be applied both to pipe section 10, and to the following pipe section 100.

In order to provide this rotation component or torque, a separable jaw clutch coupler, as illustrated in section in Figure 3, may be used. In this example, the male section 46 of the coupler is adapted to be fitted into and secured to the right end of pipe 100 as by set screw 47, and is provided with a plurality of circumferentially spaced radially inwardly extending lugs 48. The complementary or female section 49 of the coupler is likewise secured into the end of pipe section 10, as by set screw 47, and is provided with a similar series of circumferentially spaced radially outwardly extending lugs 50. When the two halves of the coupler are engaged by an axial motion, and maintained in contact as by a continuing axially applied force, they will transmit a torque in either direction, due to the interengaging lugs 48 and 50.

Obviously not all of the brackets 31 need carry rigidly secured rollers 33, as some may be loosely swiveled and serve only to support the pipe 10, while others do the actual guiding. This is particularly true of the rollers 33 on the brackets 31 on the left unit 42 of carriage 41, for so long as even one roller 33 on the right unit 43 is effective to guide the helix angle of pipe 100, the helical feed of the carriage will be operable.

In operation, when it is desired to couple a following section of pipe 100 to a section 10 already in the helical feed machine, the pipe 100 is placed upon carriage 41 by any suitable operation or means, and the carriage is moved bodily along track 40 to the right until the two parts 46 and 49 of the coupler engage fully. Brake or locking means 45 is then operated to prevent longitudinal motion of carriage 41 along track 40, particularly backwardly or to the left. The torque transmitted by the two halves of the coupling, together with the axial force component separately introduced by skew rollers 33 on carriage 41, will then cause a helical motion of pipe 10 100 exactly corresponding to that imparted by the helical feed mechanism on table 11, so that the two lengths of pipe will be maintained in closely abutting contact.

As soon as the following length of pipe 100 is actually engaged by the rotative means of the helical feed mechanism, in this case by belt 21, carriage 41 may be unlocked, run back to the left, another length of pipe placed thereon, and returned to the right to couple that section, in the manner just described. Obviously the helical feed means on table 11 need not be of the belt and skewed roller type, illustrated, and it is merely necessary that the effective skewed rollers 33 of carriage 41 be set at the same helix angle as that for which the helical feed means is adjusted.

Thus it will be apparent that this invention embodies a new and useful means for advancing, coupling and maintaining in contact successive lengths of pipe or the like that are being helically advanced by any suitable mechanism, for example, for a pipe coating operation. The essential features are believed to reside in the combination of the skew roller means on a selectively movable carriage or the like, together with the jaw coupler or its equivalent for transmitting the torque from the helically driven section to the other or following section of pipe. Although a specific construction has been described and illustrated, it is obvious that many changes and modifications can be made without departing from the essential features of the invention, and all such modifications as are within the scope of the appended claims are embraced thereby.

I claim:

1. A pipe feed device for use with a helical feed means for engaging a length of pipe, said device comprising support means adapted to receive an incoming length of pipe and movable to align and abut said incoming length of pipe with that engaged by said helical feed means, an axially separable coupler for said abutting lengths of pipe adapted to transmit a torque from one to the other, guiding elements on said support means engageable with said pipe and angularly disposed with respect to the axis of said pipe, and means for restraining said pipe support means so that said guiding elements cooperate with said coupler to impart a helical feed to said incoming pipe.

2. A pipe feed device according to claim 1, in which said support means comprises a carriage and a track for said carriage.

3. A pipe feed device according to claim 1, in which said guiding elements are disposed on both sides of said pipe axis.

4. A pipe feed device according to claim 1, in which each of said guiding elements is selectively movable about an axis which intersects the axis of said pipe.

5. A pipe feed device according to claim 1, in which said guiding elements comprise pairs of brackets oppositely spaced on said support means, rollers on said brackets and means for supporting said rollers to align the plane of rotation of said rollers substantially coincident with the helix angle of said helical feed means at the point of contact of said rollers with said pipe.

6. In a feed device for use with a helical pipe feed means, a track longitudinally aligned with the axis of said helical feed means, a carriage movable on said track, guiding elements on said carriage adapted to receive a pipe, said elements adapted to be set at an angle equal to the helix angle of the motion imparted to a pipe by said helical feed means, and means for restraining said carriage against longitudinal motion on said track.

7. A feed device according to claim 6, in which the guiding elements on said carriage are oppositely disposed and rotatable, certain of said elements being fixed to control the motion of said pipe with respect to said carriage and the remainder being free to conform to the resultant pipe motion.

8. A pipe feed device for coupling a following length of pipe to a preceding length of pipe which has been given a helical motion by a helical feed device, said pipe feed device comprising an axially separable coupler for transmitting torque from said preceding pipe to said following pipe, and guide means separate from said coupler for engaging said following pipe and cooperating with the torque transmitted by said coupler to impart a similar helical motion to said following pipe, thereby maintaining the parts of said coupler in engagement, said guide means being supported to be movable axially with respect to said helical feed device to receive a length of pipe and advance it into coupling engagement with a length of pipe which is already engaged by said helical feed device.

9. A pipe feed device according to claim 8, in which said guide means comprises guiding elements which may be fixed with regard to said helical feed device when the parts of said axially separable coupler are engaged, said guiding elements being engageable with said following pipe and angularly disposed with respect to the axis of said pipe.

10. A pipe feed device according to claim 8, in which said guide means comprises a plurality of rollers angularly disposed on both sides of the axis of said following pipe, and supports for said rollers which may be fixed with regard to said helical feed device when the parts of said coupler are engaged.

JOSEPH F. PUTNAM.